United States Patent [19]

Machado

[11] Patent Number: 5,039,743

[45] Date of Patent: Aug. 13, 1991

[54] POLYMER BLENDS OF POLYKETONES, POLYAMIDES AND CARBOXYLATED BLOCK COPOLYMERS

[75] Inventor: Joseph M. Machado, Richmond, Tex.

[73] Assignee: Shell Oil Company, Houston, Tex.

[21] Appl. No.: 411,773

[22] Filed: Sep. 25, 1989

[51] Int. Cl.$^5$ .............................................. C08L 53/02
[52] U.S. Cl. ...................................... 525/92; 525/539; 525/919; 525/185
[58] Field of Search ................... 525/92, 539, 919, 185

[56] References Cited

U.S. PATENT DOCUMENTS

| | | | |
|---|---|---|---|
| 3,694,412 | 9/1972 | Nozaki | 260/63 CQ |
| 4,839,437 | 6/1989 | Gergen et al. | 525/426 |
| 4,904,728 | 2/1990 | George | 525/185 |
| 4,906,687 | 3/1990 | Modic | 525/92 |

FOREIGN PATENT DOCUMENTS 121965 10/1984 European Pat. Off. .
257663  3/1988 European Pat. Off. .

Primary Examiner—John C. Bleutge
Assistant Examiner—Thomas Hamilton, III

[57] ABSTRACT

Blends comprising a major proportion of linear alternating polymer of carbon monoxide and at least one ethylenically unsaturated hydrocarbon, with lesser proportions of a polymeric polyamide, a carboxylated partially hydrogenated block copolymer and, optionally, an acidic polymer containing moieties of an α-olefin and an α,β-ethylenically unsaturated hydrocarbon wherein, optionally, a portion of the carboxyl groups are neutralized with non-alkali metal, demonstrate a balance of strength and improved low temperature toughness.

19 Claims, No Drawings

POLYMER BLENDS OF POLYKETONES, POLYAMIDES AND CARBOXYLATED BLOCK COPOLYMERS

FIELD OF THE INVENTION

This invention relates to polymer blends comprising a major proportion of a linear alternating polymer of carbon monoxide and at least one ethylenically unsaturated hydrocarbon. More particularly, the invention relates to blends of such linear alternating polymer with lesser amounts of a polymeric polyamide, a carboxylated, partially hydrogenated block copolymer and, optionally, an acidic polymer containing moieties of an α-olefin and an α,β-ethylenically unsaturated carboxylic acid.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. G.B. No. 1,081,304 discloses the production of similar polymers of higher carbon monoxide content in the presence of alkylphosphine complexes of palladium compounds as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now known as polyketones or polyketone polymers, has become of greater interest in part because of the greater availability of the polymers. The more recent general processes for the production of polyketone polymers are illustrated by a number of published European Patent Applications including Nos. 121,965, 181,014, 213,671 and 257,663. The processes involve the use of a catalyst composition formed from a compound of palladium, cobalt or nickel, the anion of a strong non-hydrohalogenic acid and a bidentate ligand of phosphorus, arsenic or antimony.

The resulting polymers are relatively high molecular weight materials having established utility as premium thermoplastics in the production of shaped articles such as containers for food and drink. Such articles are produced by processing methods conventional for thermoplastics. For some applications, however, it has been found to be desirable to have properties which are somewhat different from those of the polyketone polymer. It would be advantageous to retain the more desirable properties of the polyketone polymer and yet improve other properties. Such advantages are often obtained through the provision of a polymer blend.

In U.S. patent application Ser. No. 187,790, filed Apr. 29, 1988, U.S. Pat. No. 4,839,437 and Ser. No. 278,098, filed Nov. 29, 1988, U.S. Pat. No. 4,960,838 there are described blends of the polyketone and a polymeric polyamide. Copending U.S. patent application Ser. No. 382,379, filed July 20, 1989, discloses blends of the polyketones and carboxylated, partially hydrogenated block copolymer. Blends of the linear alternating polymers and acidic polymers containing α-olefin and unsaturated carboxylic acid are disclosed by copending U.S. patent application Ser. No. 203,960, filed June 8, 1988, U.S. Pat. No. 4,874,819. In the case of many blends, a gain in one property is at least partially offset by losses in other properties. An increase in strength, for example, may result in a decrease in toughness. It would be of advantage to provide a blend having a good balance of properties in which desired increases in certain of the properties are not unduly offset by undesirable losses in other properties.

SUMMARY OF THE INVENTION

The present invention provides blends comprising a major proportion of linear alternating polymer of carbon monoxide and at least one ethylenically unsaturated hydrocarbon with lesser proportions of other polymeric material. More particularly, the present invention provides blends of the polyketone polymer, a polymeric polyamide, a carboxylated, partially hydrogenated block copolymer and, optionally, an acidic polymer containing moieties of an α-olefin and an α,β-ethylenically unsaturated carboxylic acid in which, optionally, at least a portion of the carboxylic acid moieties are neutralized with non-alkali metal. These blends exhibit a good balance of strength and improved low temperature toughness.

DESCRIPTION OF THE INVENTION

The polyketone polymers which are employed as the major component of the blends of the invention are linear alternating polymers of carbon monoxide and at least one ethylenically unsaturated hydrocarbon having substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers of carbon monoxide, ethylene and second hydrocarbon are employed in the blends of the invention, there will be at least about 2 units incorporating a moiety of ethylene for each unit incorporationg a moiety of second hydrocarbon. Preferably, there will be from about 10 units to about 100 units incorporating a moiety of ethylene for each unit incorporating a moiety of second hydrocarbon. The polymer chain of the preferred polymers is therefore represented by the repeating formula

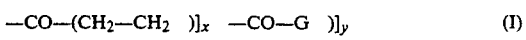

wherein G is the moiety of the second ethylenically unsaturated hydrocarbon of at least 3 carbon atoms polymerized through the ethylenic unsaturation. The —CO(CH$_2$CH$_2$) units and —CO—G) units are found randomly throughout the polymer chain and the ratio of y:x is no more than about 0.5. When copolymers of carbon monoxide and ethylene are employed in the blends of the invention, there will be no second hydrocarbon present and the copolymers are represented by the above formula (I) wherein y is zero. When y is other than zero, i.e., terpolymers are employed, preferred ratios of y:x are from about 0.01 to about 0.1. The end groups or "caps" of the polymer chain will depend in part upon what materials were present during the production of the polymer and whether or how the polymer was purified. However, the precise nature of the end groups does not appear to influence the properties of the polyketone polymer to any considerable extent so that the polymers are fairly represented by the formula for the polymeric chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of such polymers will depend in part upon the molecular weight, whether the polymer is a copolymer or a terpolymer and, in the case of terpolymers, the nature of and the proportion of the second hydrocarbon present. Typical melting points for such polymers are from about 175° C. to about 300° C., more frequently from about 210° C. to about 270° C. The polymers will have a limiting viscosity number (LVN), measured in a standard capillary viscosity measuring device in m-cresol at 60° C. of from about 0.5 dl/g to about 10 dl/g, preferably from about 0.8 dl/g to about 4 dl/g.

The method for the production of the polyketone polymers is illustrated by the above published European Patent Applications. In general, the monomers are contacted under polymerization conditions in a reaction diluent in the presence of a catalyst composition formed from a palladium compound, the anion of a non-hydrohalogenic acid having a pKa (measured in water at 18° C.) of below about 6 and preferably below 2, and a bidentate ligand of phosphorus. The scope of the polymerization process is extensive but, without wishing to be limited, a preferred palladium compound is a palladium alkanoate, particularly palladium acetate, a preferred anion is the anion of trifluoroacetic acid or p-toluenesulfonic acid, and a preferred bidentate phosphorus ligand is 1,3-bis(diphenylphosphino)propane or 1,3-bis[di(2-methoxyphenyl)phosphino]propane.

The reaction diluent in which the polymerization is conducted in an alkanol such as methanol or ethanol. Methanol is preferred. The reactants, the catalyst composition and the reaction diluent are contacted during polymerization by conventional methods such as shaking or stirring in a suitable reaction vessel. The polymerization conditions typically include a reaction temperature from about 20° C. to about 150° C. with reaction temperatures from about 50° C. to about 135° C. being preferred. The reaction pressure is from about 1 atmosphere to about 200 atmospheres but more often is from about 10 atmospheres to about 100 atmospheres. Subsequent to polymerization the reaction is terminated as by cooling the reactor and contents and releasing the pressure. The polyketone polymer is usually obtained as a material substantially insoluble in the reaction diluent and is recovered by well known methods such as filtration or decantation. The polymer product is used as recovered or is purified as by contact with a solvent or extraction agent selective for catalyst residues.

The second component of the blends of the invention, present as a minor component, is a polymeric polyamide. By the term "polyamide" is meant a condensation product which contains recurring amide groups as integral parts of a polymeric chain. These polymeric polyamides are well known in the art and are often referred to as Nylons. Suitable polyamides for use in the blends of the invention are crystalline or amorphous polymers of linear or branched structure and a molecular weight of at least about 5000. The preferred polyamides are linear in structure, wherein each recurring monomeric unit has from 2 to 16 carbon atoms inclusive, and have melting points in excess of about 200° C.

In one embodiment of the polyamide blend component the polyamide is homopolymeric in character, illustratively being a homopolymer of an aminocarboxylic acid of up to 16 carbon atoms although in practice the monomeric unit is typically provided as a lactam, e.g., butyrolactam, caprolactam or lauryllactam. Such polyamides are often identified in terms of the number of carbon atoms in the monomeric unit. For example, the polyamide illustratively derived from caprolactam is termed Nylon 6.

In a preferred embodiment of the polyamide blend component the polyamide is copolymeric in character and is illustratively represented as a condensation product of a primary diamine and a dicarboxylic acid. The primary diamine is preferably a terminal primary diamine having up to 16 carbon atoms inclusive and at least two carbon atoms between the two primary amino groups which are located on terminal carbon atoms of the diamine structure. The diamines suitably contain aromatic moieties linking the amino groups as illustrated by phenylenediamine, 4,4'-diaminobiphenyl or di(4-aminophenyl) ether, or the linking group is cycloaliphatic as illustrated by di(4-aminocyclohexyl)methane or 1,4-diaminocyclooctane. The preferred diamines, however, are acyclic terminal primary diamines of the formula

$$H_2N-(CH_2)_n\,NH_2 \qquad (II)$$

wherein n is an integer from 2 to 16 inclusive. Such polymethylenediamines are illustrated by trimethylenediamine, tetramethylenediamine, hexamethylenediamine, dodecamethylenediamine and hexadecamethylenediamine. Of these diamines, hexamethylenediamine is preferred.

The dicarboxylic acid suitably has up to 16 carbon atoms inclusive as is illustrated by aromatic dicarboxylic acids such as isophthalic acid, terephthalic acid and 2,6-naphthalenedicarboxylic acid. The preferred dicarboxylic acids, however, are aliphatic dicarboxylic acids, particularly those of the formula

$$HO_2C-CH_2)_m\,CO_2H \qquad (III)$$

wherein m is an integer from 0 to 14 inclusive. Illustrative of such dicarboxylic acids are oxalic acid, pimelic acid, sebacic acid, suberic acid, adipic acid, azelaic acid and undecanedioic acid. Of these dicarboxylic acids, adipic acid is preferred.

The production of the polymeric polyamide blend component is well known and conventional in the art. It should be understood that although the copolymeric polyamides are represented above as the condensation product of dicarboxylic acids and primary diamines, this representation is for convenience and clarity and the monomeric units may suitably be provided in an equivalent form. For example, the diacid component may be provided as the dialkyl ester of the dicarboxylic acid. The copolymeric polyamides are also often identified by the number of carbon atoms in the monomeric units. For example, the polyamide illustratively formed from hexamethylenediamine and adipic acid is termed Nylon 6,6. The polyamide illustratively produced from hexamethylenediamine and dodecanedioic acid is termed Nylon 6,12.

The polymeric polyamide blend component is present as a minor component of the blends of the invention. For some applications the presence of the polyamide in amounts as low as about 1% by weight based on total polymer blend is satisfactory. A quantity of polyamide of about 30% by weight on the same basis represents a practical upper limit for the polyamides in the blends in which polyketone polymer is present as a major component since attempts to prepare such blends containing more than about 30% by weight of polyamide are largely unsuccessful because of processing difficulties. Preferred blends of the invention contain from about 10% by weight to about 25% by weight of the polyamide based on total blend. Blends containing from about 15% by weight to about 25% by weight on the same basis are particularly preferred.

The third component of the blends of the invention, also present as a minor component of the blends, is a carboxylated, partially hydrogenated block copolymer. The block copolymer precursor of the blend component is a two-block or diblock copolymer having one block of at least predominantly polymerized vinyl aromatic compound and one block of at least predominantly polymerized conjugated alkadiene. Illustrative vinyl aromatic compounds for what is conventionally termed the A block of such block copolymers include styrene, α-methylstyrene, p-methylstyrene and p-ethylstyrene. Styrene and α-methylstyrene are preferred, particularly styrene. The conjugated alkadiene monomers for what is conventionally termed the B block include butadiene, piperylene, isoprene and 1,3-hexadiene. Butadiene and isoprene are preferred, especially butadiene. The production of such block copolymers is well known and typically involves a lithium alkyl catalyst. Polymerization to form a diblock copolymer is generally sequential with the A block being formed first, followed by addition of alkadiene for production of the B block. It is also known to form blocks which are homopolymeric through complete polymerization of the vinyl aromatic compound before alkadiene addition or alternatively the alkadiene is provided before vinyl aromatic compound polymerization is complete to form blocks which are termed "tapered." The polymerization of the alkadiene may be 1,4-polymerization involving both the conjugated double bonds to form a linear polymeric chain containing carbon-carbon unsaturation or the polymerization may be 1,2-polymerization involving one double bond to produce a saturated aliphatic polymeric chain having pendant vinyl groups. In practice, both types of polymerization take place but relative amounts of each type are controlled by well known techniques.

The block copolymer precursor of the blend component will typically be from about 2% by weight to about 55% by weight of A block with the remainder being B block, and will contain from about 25% to about 65% of 1,2-polymerization in the aliphatic block.

The block copolymers are partially and selectively hydrogenated to increase stability and improve resistance to oxidation. It is desirable to selectively hydrogenate most of the aliphatic unsaturation of the B block while not hydrogenating the aromatic unsaturation of the A block. Such hydrogenation is conducted by standard techniques and generally involves dissolving the block copolymer in a hydrocarbon solvent, e.g., cyclohexane, and contacting the resulting solution with hydrogen in the presence of a soluble transition metal hydrogenation catalyst. The block copolymers are hydrogenated until the residual aliphatic unsaturation of the aliphatic B block is no more than about 20% and preferably no more than about 2% of the unsaturation of the block copolymer prior to hydrogenation.

The carboxylated, partially hydrogenated block copolymer employed as the blend component of the blends of the invention is produced by metalation of the partially hydrogenated block copolymer with an alkali metal followed by reaction with carbon dioxide and acid. Although other alkali metals are suitable, metalation generally takes place by reaction of lithium with the aromatic portion of the partially hydrogenated block copolymer to introduce lithium onto the aromatic rings and occasionally onto the benzylic carbon atoms of the aromatic portion. The lithium is typically provided as a lithium alkyl or lithium hydride and certain tertiary amines, for example "bridgehead" tertiary amines such as triethylenediamine, are employed as a metalation promoter. The metalation reaction, also conventional, takes place in solution at temperatures from about 25° C. to about 75° C. to introduce at least one lithium moiety for each 1000 monomeric units of the aromatic portion but no more than about one lithium moiety for each monomeric unit of the aromatic portion of the partially hydrogenated block copolymer.

The carboxylation of the metalated, partially hydrogenated block copolymer is efficiently conducted by contacting the metalated polymer with carbon dioxide as by passing the gaseous carbon dioxide through a solution of the metalated polymer in an inert reaction diluent such as cyclohexane. Upon completion of the reaction of the metalated polymer and carbon dioxide, the resulting carboxylated polymer is acidified, preferably with an organic acid such as acetic acid or citric acid. The overall production of the carboxylated, partially hydrogenated diblock copolymers is conventional and a number of such polymers are commercial, being marketed by Shell Chemical Company under the trademark SHELLVIS ®.

The carboxylated, partially hydrogenated block copolymer is present in the blends of the invention in an amount of from about 0.5% by weight to about 15% by weight, based on total blend, but preferably in an amount from about 3% by weight to about 8% by weight on the same basis.

The optional fourth component of the blends of the invention, present as a minor component when employed, is a polymer of an α-olefin and an α,β-ethylenically unsaturated carboxylic acid, optionally containing a third monomer and optionally having a portion of the carboxylic acid groups of the polymer neutralized with non-alkali metal. The α-olefin monomer of the optional blend component is an α-olefin of up to 10 carbon atoms inclusive such as ethylene, propylene, styrene, isobutylene, 1-hexene and 1-decene. Aliphatic straight chain α-olefins of up to 4 carbon atoms inclusive are preferred and particularly preferred is ethylene. The α-olefin monomer of the optional blend component is present in at least 65% by mole of the optional blend component and is preferably present in at least 85% by mole on the same basis.

The unsaturated carboxylic acid monomer of the optional blend component is an α,β-ethylenically unsaturated carboxylic acid of up to 10 carbon atoms inclusive and is exemplified by acrylic acid, 2-hexenoic acid, 2-octenoic acid and 2-decenoic acid. The preferred ethylenically unsaturated carboxylic acids have up to 4 carbon atoms inclusive and are acrylic acid, methacrylic acid and crotonic acid. Acrylic acid and methacrylic acid are particularly preferred. The unsaturated carboxylic acid monomer of the optional blend component is present in an amount from about 1% by mole to about 35% by mole, based on total polymeric component. Amounts of unsaturated carboxylic acid from about 5% by mole to about 20% by mole on the same basis are preferred.

The optional blend component is suitably a copolymer of the α-olefin and the α,β-ethylenically unsaturated carboxylic acid and in general such copolymers are preferred. On occasion, however, it is useful to incorporate as an optional third monomer a non-acidic, low molecular weight polymerizable monomer of up to 8 carbon atoms inclusive. Such optional monomer may be an additional α-olefin such as propylene or styrene when the major monomer of the optional blend component is ethylene, an unsaturated ester such as vinyl acetate or methyl methacrylate, an unsaturated halohydrocarbon such as vinyl chloride or vinyl fluoride or an unsaturated nitrile such as acrylonitrile. As previously stated, the presence of the third monomer within the optional blend component is optional and amounts up to about 5% by mole, based on total blend component, are satisfactory with amounts up to about 3% on the same basis being preferred.

Independent of whether the polymer of the optional blend component is a copolymer or a terpolymer, in an optional embodiment of this blend component a portion of the carboxylic acid groups are neutralized with non-alkali metal. When partially neutralized, the blend component is polymeric in form while exhibiting ionic character and is of the type conventionally referred to as a metal ionomer. In the partially neutralized embodiment the olefin/unsaturated acid polymer, with or without third monomer, is reacted with a source of ionizable zinc, magnesium or aluminum compound sufficient to neutralize from about 10% to about 90% of the carboxyl groups present in the polymer. Such neutralization, particularly with the preferred non-alkali metal zinc, results in a uniform distribution of metal throughout the polymer. Neutralization of from about 20% to about 80% of the carboxyl groups is preferred in this embodiment. The ionizable metal compound used in the neutralization is a source of complexed or uncomplexed non-alkali metal ions such as zinc ions, magnesium ions or aluminum ions which are provided in the form of the uncomplexed metal compounds commonly referred to as metal salts, e.g., zinc chloride, zinc acetate or zinc formate, or in the form of complexed metal ions wherein the metal is bonded to two types of groups, at least one of which is readily ionizable and at least one other is not. Illustrative of such complexed metal ions are mixed zinc salts with one weak acid such as oleic acid or stearic acid and one more ionizable such as acetic acid or formic acid. In general, neutralization with a complexed metal ion is preferred.

The optionally partially neutralized polymers employed as the optional fourth blend component of the blends of the invention are conventional and many are commercial. Copolymers of ethylene and acrylic acid are marketed by Dow under the trademark PRIMACORE ® and copolymers of ethylene and methacrylic acid are marketed by DuPont under the trademark NUCREL ®. Partially neutralized polymers are marketed by DuPont under the trademark SURLYN ®. The presence of the acidic polymer as the optional fourth blend component is not required and amounts up to about 10% by weight based on total blend are satisfactory, with quantities of the fourth blend component, when present, from about 0.1% by weight to about 5% by weight on the same basis being preferred.

The method of producing the blends of the invention is not critical so long as an intimate mixture of the blend components is obtained, i.e., a uniform mixture that will not delaminate upon processing. The blends are non-miscible blends with the polymeric polyamide, the carboxylated, partially hydrogenated block copolymer and, optionally, the acidic polymer, existing as discrete phases within a matrix of the polyketone polymer. The blend will not, of course, be uniform, but the distribution of the minor blend components throughout the continuous polyketone polymer phase will be substantially uniform. The method of blending the components is that which is conventional for the blending of non-miscible polymeric materials. In one modification, the components are blended by passage through a twin-screw, corotating extruder operating at high RPM to produce the blend as an extrudate. In an alternate modification, the components are blended in a mixing device which exhibits high shear and thermal energy.

The blends of the invention may contain conventional additives such as antioxidants, stabilizers, mold release agents and other materials which are added to increase the processability of the components or to modify the properties of the blend. Such additives are incorporated prior to, together with or subsequent to the blending of the components.

The blends of the invention are characterized by a good balance of strength and low temperature toughness. They are processed by conventional methods such as extrusion, injection molding and thermoforming into a variety of shaped articles of established utility. The blends find particular application when shaped products require both strength and low temperature toughness, for example, in the production of internal and external parts for automotive applications and containers for frozen or refrigerated food and drink.

The invention is further illustrated by the following Illustrative Embodiments which should not be construed as limiting the invention.

ILLUSTRATIVE EMBODIMENT I

A linear alternating terpolymer [88/022] of carbon monoxide, ethylene and propylene was produced in the presence of a catalyst composition formed from palladium acetate, trifluoroacetic acid and 1,3-bis[di(2-methoxyphenyl)phosphino]propane. The terpolymer had a melting point of 219° C. and a limiting viscosity number (LVN), measured in m-cresol at 60° C. of 1.78 dl/g.

ILLUSTRATIVE EMBODIMENT II

Various blends of the terpolymer of Illustrative Embodiment I were produced with varying proportions of ZYTEL ® 101, a Nylon 6,6, and SHELLVIS ® 50, a partially hydrogenated diblock copolymer of styrene and butadiene, carboxylated in the aromatic portion to 1.5% by weight. All blends contained 1% by weight of NUCREL® 535, a copolymer of ethylene and methacrylic acid. The blends were compounded on a Haake 30 mm twin screw corotating extruder with a L/D equal to thirteen. Test specimens were prepared on a 25 ton Arburg injection molding machine having a screw L/D equal to eighteen. The specimens were stored over desiccant until testing.

Certain of the specimens were employed to determine notched Izod values at room temperature and at 0° C., determined by standard techniques. The results of the blend testing, together with testing of unblended terpolymer, are shown in Table I.

TABLE I

| Composition, % wt (ex NUCREL ®) | | | Notched Izod, ft.lb/in | |
|---|---|---|---|---|
| Terpolymer | Nylon | SHELLVIS ® | R.T. | 0° C. |
| 100 | 0 | 0 | 4.7 | 1.6 |
| 95 | 0 | 5 | .7.4 | 2.4 |
| 80 | 0 | 20 | 4.9 | 2.4 |
| 80 | 20 | 0 | 12.7 | 1.7 |
| 85 | 10 | 5 | 9.3 | 3.4 |
| 80 | 10 | 10 | 5.0 | 2.2 |
| 70 | 20 | 10 | 12.8 | 2.2 |

The same blends and terpolymer were evaluated for Gardner falling dart impact values by standard techniques. The results are shown in Table II.

TABLE II

| Composition, % wt (ex NUCREL ®) | | | Gardner (−30° C.) |
|---|---|---|---|
| Terpolymer | Nylon | SHELLVIS ® | (in lbs) |
| 100 | 0 | 0 | 216 |
| 95 | 0 | 5 | 70 |
| 80 | 0 | 20 | 33 |
| 80 | 20 | 0 | 13 |
| 85 | 10 | 5 | 84 |
| 80 | 10 | 10 | 24 |
| 70 | 20 | 10 | 15 |

The tensile properties of these blends and the terpolymer control were determined by standard techniques. The results are shown in Table III.

TABLE III

| Composition, % wt (ex NUCREL ®) | | | Tensile (ksi) | Yield Stress (psi) | Stress at break (psi) | Elongation at break (%) |
|---|---|---|---|---|---|---|
| Terpolymer | Nylon | SHELLVIS ® | | | | |
| 100 | 0 | 0 | 217 | 8470 | 9460 | 310 |
| 95 | 0 | 5 | 216 | 8820 | 7460 | 160 |
| 80 | 0 | 20 | 176 | 6550 | 6420 | 21 |
| 80 | 20 | 0 | 307 | 9500 | 9270 | 100 |
| 85 | 10 | 5 | 236 | 9200 | 8890 | 210 |
| 80 | 10 | 10 | 203 | 7950 | 7210 | 32 |
| 70 | 20 | 10 | 203 | 8200 | 7100 | 53 |

In this system the preferred composition comprises 85% wt terpolymer, 10% wt nylon and 5% wt SHELLVIS® polymer.

What is claimed is:

1. A polymer blend comprising a major proportion of a linear alternating polymer of carbon monoxide and at least one ethylenically unsaturated hydrocarbon and minor proportions of (a) a polymeric polyamide having recurring amide groups in the polymer chain, (b) a carboxylated, partially hydrogenated diblock copolymer of a vinyl aromatic compound and a conjugated alkadiene, the carboxylation being primarily on aromatic rings, and optionally (c) an acidic polymer of an α-olefin and an α,β-ethylenically unsaturated carboxylic acid, optionally containing a non-acidic, low molecular weight polymerizable monomer and optionally having a portion of the carboxyl groups neutralized with non-alkali metal.

2. The blend of claim 1 wherein the linear alternating polymer is represented by the repeating formula —CO—(CH$_2$—CH$_2$ )]$_x$—CO—G)]$_y$ wherein G is the moiety an ethylenically unsaturated hydrocarbon of at least 3 carbon atoms polymerized through the ethylenic unsaturation and the ratio of y:x is no more than about 0.5.

3. The blend of claim 2 wherein the carboxylated, partially hydrogenated diblock copolymer is a copolymer of styrene or α-methylstyrene and butadiene or isoprene.

4. The blend of claim 3 wherein the acidic polymer is a copolymer of ethylene and acrylic acid or methacrylic acid.

5. The blend of claim 4 wherein the polyamide is a linear polyamide having from 2 to 16 carbon atoms inclusive in each monomeric unit and a melting point in excess of 200° C.

6. The blend of claim 5 wherein y is zero.

7. The blend of claim 5 wherein G is a moiety of propylene and the ratio of y:x is from about 0.01 to about 0.1.

8. The blend of claim 7 wherein the diblock copolymer is a copolymer of styrene and butadiene or isoprene, the partially hydrogenated block copolymer contains no more than about 20% of the aliphatic carbon-carbon unsaturation of the block copolymer and the carboxylated, partially hydrogenated block copolymer contains at least one carboxyl group for each aromatic block but no more than one carboxyl group for each aromatic moiety of the aromatic portion of the partially hydrogenated block copolymer.

9. The blend of claim 8 wherein the polyamide is homopolymeric in character.

10. The blend of claim 9 wherein the acidic polymer is a non-neutralized copolymer of ethylene and acrylic acid or methacrylic acid.

11. The blend of claim 10 wherein the block copolymer is a copolymer of styrene and butadiene.

12. The blend of claim 11 wherein the acidic polymer is a copolymer of ethylene and acrylic acid.

13. The blend of claim 11 wherein the polyamide is a homopolymer derived from caprolactam.

14. The blend of claim 8 wherein the blend is copolymeric in character derived from a primary diamine of the formula H$_2$N—(CH$_2$ )$_n$ NH$_2$ wherein n is an integer from 2 to 16 inclusive, and an aliphatic dicarboxylic acid of the formula HO$_2$C—CH$_2$ )$_m$ CO$_2$H wherein m is an integer from 0 to 14 inclusive.

15. The blend of claim 14 wherein the acidic polymer is a non-neutralized copolymer of ethylene and acrylic acid or methacrylic acid.

16. The blend of claim 15 wherein the block copolymer is a copolymer of styrene and butadiene.

17. The blend of claim 16 wherein the polyamide is derived from hexamethylenediamine and adipic acid.

18. The blend of claim 17 wherein the acidic polymer is a copolymer of ethylene and acrylic acid.

19. The blend of claim 17 wherein the acidic polymer is a copolymer of ethylene and methacrylic acid.

* * * * *